April 5, 1938.   A. VIGNE   2,113,039
DISK DRIVE FOR JOURNAL BEARINGS
Filed Aug. 22, 1936
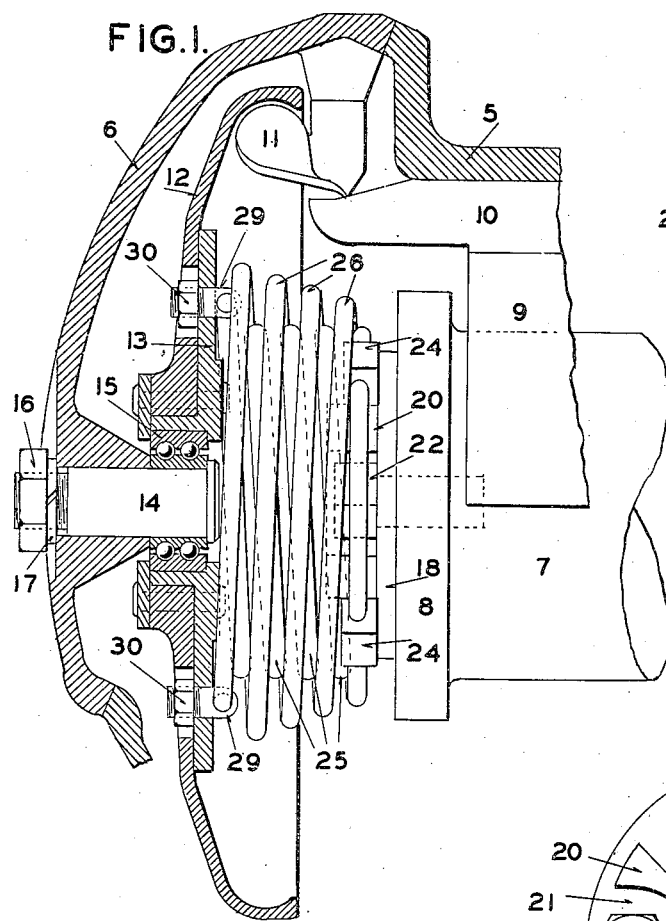
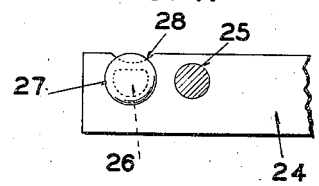
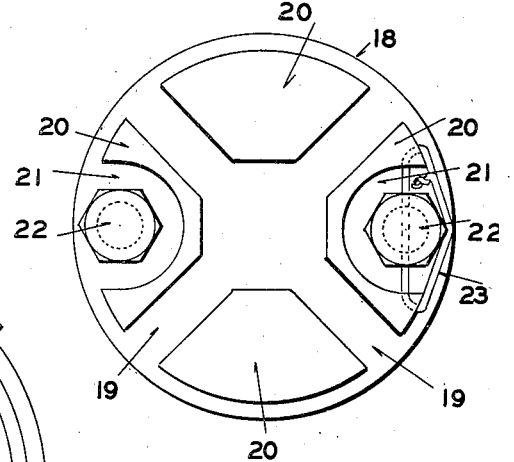
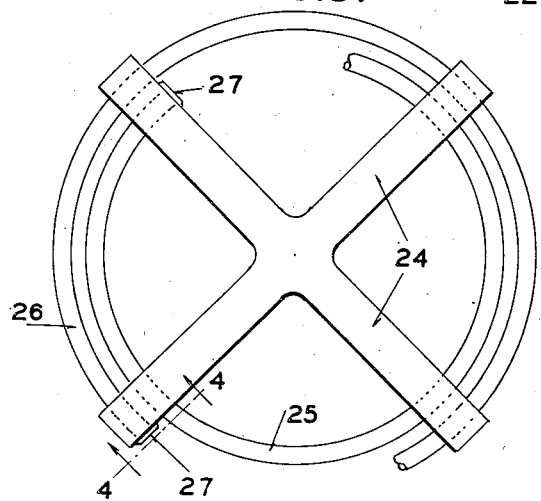
INVENTOR
ALBERT VIGNE
BY
ATTORNEY Patented Apr. 5, 1938

2,113,039

UNITED STATES PATENT OFFICE 2,113,039

DISK DRIVE FOR JOURNAL BEARINGS

Albert Vigne, Webster Groves, Mo., assignor to National Bearing Metals Corporation, St. Louis, Mo., a corporation of New York Application August 22, 1936, Serial No. 97,480

5 Claims. (Cl. 308—85)

My invention relates to a disk drive for journal bearings and more particularly to that type of bearings shown, for example, in my Patent No. 2,081,314 of May 25, 1937, in which oil contained in a reservoir in the lower part of the bearing box is raised and supplied to the bearing by means of a rotating disk driven by a suitable connection with the axle.

In bearings of the type above referred to it is impossible to maintain alignment of the axis of the disk with that of the axle from which it is driven due to the relative movement of the box and axle both laterally and angularly which takes place while the car is in motion to permit the alignment of the axle and bearing. The driving and driven members are thus placed in eccentric relation with the result that the disk is alternately accelerated and retarded once in each revolution. This introduces objectionable wear and noise in the operation of the device as well as imposing dangerous impacts on the engaging parts, especially at high speed.

The object of my invention is to provide a flexible connection between the disk and the axle whereby impacts will be absorbed by spring means and which will permit the driving and driven parts to operate at uniform speeds even though their axes are neither concentric nor parallel.

In the accompanying drawing which illustrates one form of device made in accordance with my invention Figure 1 is a side elevation, some of the parts being shown in section; Figure 2 is a face view of the driving plate; Figure 3 is a face view of the driven plate; and Figure 4 is a section taken on the line 4—4 of Figure 3.

Referring first to Figure 1, the numeral 5 indicates a journal box provided with the usual removable cover 6. Situated in the box is the axle 7 provided with a collar 8. Positioned between the axle and the top of the box are the brass or bearing 9 and wedge 10. The latter receives lubricant from a spoon 11 carried by cover 6, the lubricant being removed from the trough of a lubricating disk 12 by the spoon. The disk is secured to a hub plate 13 mounted on a pin 14 by means of an antifriction bearing 15. Pin 14 is carried in cover 6 in alignment with the axis of the axle when the latter is in its normal position. The pin is held in position by a nut 16 and lock washer 17.

Secured to the end face of axle collar 8 is the driving plate 18. The face of this plate has formed in it a pair of slots 19 crossing each other at right angles so as to divide the face into four equal sectors 20 forming driving lugs. Two of these sectors at opposite sides of the plate have formed in them recesses 21 for the reception of the heads of cap bolts 22 by means of which the plate is secured in position. The bolts may be locked against rotation by means of tie wires 23, as shown at the right-hand side of Figure 2. The driven plate 24 is in the form of a cross, the arms of which fit snugly in slots 19, the ends of the arms projecting beyond the ends of said slots. In these projecting parts of the arms are secured the inner ends of two nested torsion springs 25 and 26 which are of opposite pitch. I prefer to secure the springs to the arms by threading them through holes drilled in the arms, providing the ends of springs with heads 27, and compressing the metal of the arms against the springs at the points adjacent the heads as shown at 28 (Figure 4). The outer ends of the springs are secured to the hub plate 13 by means of eyebolts 29 through the eyes of which the ends of the springs are threaded. Nuts 30 on the bolts serve to draw the ends of the springs firmly against the plate to lock them in position.

Space limitations imposed by the design of the device require that the inner spring 25 be wound, from the driven end to the last coil of the driving end, of a constant diameter and that the last turn on the driving end be wound at a larger diameter, the radius of which diameter is the average between the radii of the last turn of the outer spring 26 and the normal radius of the inner spring. The outer spring is wound in the form of a cone increasing in diameter from the driven to the driving end, the last turn on the driving end, however, being reduced to the same diameter as the last turn of the inner spring. The two springs are thus secured to the hub plate at points equidistant from the axis of the disk, not only securing uniform driving power from either spring but also insuring balance of the disk by the uniform spacing of the eyebolts, or other fastening means, from the axis of the disk.

The free height of the springs is such that they will be compressed when placed in position, thus firmly holding the arms of the driven plate 24 in slots 19 of the driving plate. By the use of two torsion springs wound of opposite pitch, torque will be transmitted equally well in either direction of rotation as the coils of one spring are always in tension tending to contract and so relieve and limit the expansion of the other spring. This form of connection also permits the necessary relative movement of the disk and axle, both laterally and angularly, without binding or cramping of the parts. Further, the connection being a flexible and not a rigid one, the disk may rotate at uniform speed notwithstanding any lack of alignment between the axes of the driven and driving members.

Having fully described my invention, what I claim as new and desire to secure by Letters Patent of the United States is:

1. In a device of the class described, the combination with a lubricating disk, of an axle, a torsion spring carried by said disk, a driving plate carried by the axle, and a driven plate carried by the spring, said driven and driving plates being maintained in engagement by compression of the spring.

2. In a device of the class described, the combination with a lubricating disk, of an axle, a pair of nested torsion springs carried by said disk at their outer ends, a driven plate carried on the inner ends of said springs, and a driving plate on the axle, said driven and driving plates having interlocking connection maintained by compression of the springs.

3. In a device of the class described, the combination with a lubricating disk, of an axle, a torsion spring unit secured to the disk, a driven plate carried by said unit, and a driving plate carried by the axle, one of the plates being provided with a recess and the other with a corresponding projection, said recess and projection being maintained in cooperative relation by the compression of the spring unit.

4. In a device of the class described, the combination with a lubricating disk, of an axle, a torsion spring unit secured to the disk, a driven plate provided with arms through which the springs of the unit are threaded, and a driving plate carried by the axle, said driving plate being provided with slots corresponding to the arms of the driven plate and held in engagement therewith by the action of the spring unit.

5. In a device of the class described, the combination with a lubricating disk, of an axle, a torsion spring unit secured to the disk, said unit comprising a pair of nested coil springs having their outer ends secured to the disk at points equidistant from the axis thereof, a driven plate having arms through which the inner ends of the springs are threaded, and a driving plate carried by the axle, said driving plate having slots in which the arms of the driven plate are retained by the action of the spring unit.

ALBERT VIGNE.